United States Patent
Balashova et al.

(10) Patent No.: US 12,033,247 B2
(45) Date of Patent: Jul. 9, 2024

(54) THREE-DIMENSIONAL SHAPE RECONSTRUCTION FROM A TOPOGRAM IN MEDICAL IMAGING

(71) Applicant: Siemens Healthineers AG, Forchheim (DE)

(72) Inventors: Elena Balashova, Princeton, NJ (US); Jiangping Wang, Carteret, NJ (US); Vivek Singh, Princeton, NJ (US); Bogdan Georgescu, Princeton, NJ (US)

(73) Assignee: Siemens Healthineers AG, Forchheim (DE)

( * ) Notice: Subject to any disclaimer, the term of this patent is extended or adjusted under 35 U.S.C. 154(b) by 382 days.

(21) Appl. No.: 17/295,631

(22) PCT Filed: May 31, 2019

(86) PCT No.: PCT/EP2019/064161
§ 371 (c)(1),
(2) Date: May 20, 2021

(87) PCT Pub. No.: WO2020/114632
PCT Pub. Date: Jun. 11, 2020

(65) Prior Publication Data
US 2022/0028129 A1   Jan. 27, 2022

Related U.S. Application Data

(60) Provisional application No. 62/775,440, filed on Dec. 5, 2018.

(51) Int. Cl.
*G06T 11/00* (2006.01)
*G06N 20/00* (2019.01)

(52) U.S. Cl.
CPC ............ *G06T 11/006* (2013.01); *G06N 20/00* (2019.01); *G06T 2210/41* (2013.01); *G06T 2211/40* (2013.01)

(58) Field of Classification Search
CPC ............... G06T 11/006; G06T 2210/41; G06T 2211/40; G06T 2211/436; G06T 2211/441; G06N 20/00
See application file for complete search history.

(56) References Cited

U.S. PATENT DOCUMENTS

| | | | |
|---|---|---|---|
| 2017/0372193 A1 | 12/2017 | Mailhe et al. | |
| 2019/0057521 A1* | 2/2019 | Teixeira | G06N 3/044 |
| 2019/0325620 A1* | 10/2019 | Adler | G06T 7/10 |

FOREIGN PATENT DOCUMENTS

| | | |
|---|---|---|
| CN | 107016666 A | 8/2017 |
| CN | 107481326 A | 12/2017 |
| WO | 2018067978 A1 | 4/2018 |

OTHER PUBLICATIONS

Lu G et al, Neural Network Shape: Organ Shapre Representation, 2016, IEEE International Conference on Acoustics, Speech and Signal Processing, pp. 1-5. (Year: 2016).*

(Continued)

*Primary Examiner* — Aaron W Carter
*Assistant Examiner* — Kathleen M Broughton (57) ABSTRACT

A 3D shape is reconstructed from a topogram. A generative network is machine trained. The generative network includes a topogram encoder for inputting the topogram and a decoder to output the 3D shape from the output of the encoder. For training, one or more other encoders are included, such as for input of a mask and/or input of a 3D shape as a regularlizer. The topogram encoder and decoder are trained with the other encoder or encoders outputting to the decoder. For application, the topogram encoder and decoder as trained, with or without the encoder for the mask and without the encoder for the 3D shape, are used to estimate the 3D shape for a patient from input of the topogram for that patient.

11 Claims, 6 Drawing Sheets

(56) References Cited

OTHER PUBLICATIONS

Heljakka A, Pioneer Networks: Progressively Growing Generative Autoencoder, 2018, arXiv:1807.03026v2. pp. 1-22. (Year: 2018).*
Zhou X et al, Deep learning of the sectional appearances of 3D CT images for anatomical structure segmentation based on an FCN voting method, 2017, Med. Phys. 44(10): 5221-5233. (Year: 2017).*
You C et al, CT Super-resolution GAN Constrained by the Identical, Residual, and Cycle Learning Ensemble, 2018, arXiv: 1808.04256v3. pp. 1-16. (Year: 2018).*
Shan H et al, 3-D Convolutional Encoder-Decoder Network for Low-Dose CT via Transfer Learning From a 2-D Trained Network, 2018, IEEE Transactions on Medical Imaging, 37(6): 1522-1534. (Year: 2018).*
Lu G et al, Neural Network Shape: Organ Shape Representation, 2016, IEEE International Conference on Acoustics, Speech and Signal Processing, pp. 1-5. (Year: 2016).*
Zhong G et al, Generative Adversarial Networks with Decoder-Encoder Output Noise, 2018, arXiv:1807.03923v1. pp. 1-12. (Year: 2018).*
Hermonza et al, 3D Reconstruction of Incomplete Archaeological Objects Using a Generative Adversarial Network, 2018, arXiv: 1711.06363v2. pp. 1-7. (Year: 2018).*
Zhang et al, Task Driven Generative Modeling for Unsupervised Domain Adaptation: Application to X-ray Image Segmentation, 2018, arXiv:1806.07201v1, pp. 1-9. (Year: 2018).*
Shin et al, Pixels, voxels, and views: A study of shape representations for single view 3D object shape prediction, 2018, arXiv: 1804.06032v2, pp. 1-9. (Year: 2018).*
Zhu, Rui, et al. "Rethinking reprojection: Closing the loop for pose-aware shape reconstruction from a single image." Proceedings of the IEEE International Conference on Computer Vision. 2017.
Balashova, Elena, et al. "Structure-aware shape synthesis." 2018 International Conference on 3D Vision (3DV). IEEE, 2018.
Hu, Xuyang, et al. "Structure-Aware 3D Shape Synthesis from Single-View Images." BMVC. 2018.
Balashova, Elena, et al. "3D Organ Shape Reconstruction from Topogram Images." International Conference on Information Processing in Medical Imaging. Springer, Cham, 2019.
Gadelha, Matheus, Subhransu Maji, and Rui Wang. "3d shape induction from 2d views of multiple objects." 2017 International Conference on 3D Vision (3DV). IEEE, 2017.
Niu, Chengjie, Jun Li, and Kai Xu. "Im2struct: Recovering 3d shape structure from a single rgb image." Proceedings of the IEEE conference on computer vision and pattern recognition. 2018.
Smith, Edward J., and David Meger. "Improved adversarial systems for 3d object generation and reconstruction." Conference on Robot Learning. PMLR, 2017.
Wu, Jiajun, et al. "Learning a probabilistic latent space of object shapes via 3d generative-adversarial modeling." Advances in neural information processing systems 29 (2016).

* cited by examiner

THREE-DIMENSIONAL SHAPE RECONSTRUCTION FROM A TOPOGRAM IN MEDICAL IMAGING

RELATED APPLICATION

The present patent document is a U.S. National Phase application of PCT/EP2019/064161 filed on May 31, 2019, which claims the benefit of the filing date under 35 U.S.C. § 119(e) of Provisional U.S. Patent Application Ser. No. 62/775,440, filed Dec. 5, 2018, which is hereby incorporated by reference.

BACKGROUND

The present embodiments relate to observing realistic organ shape. Accurate depiction of internal organs, such as the liver, may allow for more accurate health screening, early diagnosis, and planning of procedures to target specific locations in the human body. Visualization of three-dimensional (3D) organs assists in clinical applications such as surgical planning and post-surgical assessment, as well as pathology detection and disease diagnosis.

The liver and other organs may exhibit highly heterogeneous shape variation, making the liver difficult to segment. Liver volume segmentation is performed semi-automatically or automatically using statistical shape models, sigmoid-edge modelling, graph-cut, or other processes. Automatic deep learning-based methods may be used. However, these methods rely on volume information available from a computed tomography (CT) scan. Existing delineation tools delineate the 2D shape in each slice of the 3D CT volume and combine the set of predictions into the 3D shape. This intermediate slice-by-slice processing may introduce an additional source of error to the overall shape prediction quality due to the lack of spatial context. The procedures to obtain the CT scans involve long patient-doctor interaction time, costly machinery, and exposure to a dose of radiation. The practical challenges in obtaining the CT scans may preclude obtaining accurate 3D organ depictions.

Topograms, which are projected 2D images from tomographic devices, such as X-ray, may be more easily obtained, be less costly, require less radiation, and are often used by medical professionals. Delineating 3D organ shape from two-dimensional (2D) X-ray images (e.g., topograms) is difficult due to visual ambiguities and information loss as a result of projection in X-ray imaging. 2D shape extraction from X-ray is particularly complex as projection may result in complex or fuzzy textures, boundaries and anatomical part overlap. To mitigate these challenges, traditional methods use prior knowledge, such as motion patterns or intensity and background analysis, in order to perform X-ray segmentation. More recent methods focus on learning to segment using deep neural networks. For example, an X-ray image is decomposed into non-overlapping components using a generative adversarial network (GAN) to improve segmentation quality. Unpaired image-image translation techniques are applied to learn to segment the X-ray image by observing CT scan segmentation. These methods achieve results on 2D shape delineation and segmentation tasks but not 3D.

In the computer vision domain, deep generative 3D shape models based on variational auto-encoder networks (VAE) and generative adversarial networks (GAN) are trained to generate complex topologies of shapes. Combined with a mapping from image space, these methods are able to infer 3D shape predictions from 2D observations. To obtain more detailed and accurate predictions, input annotations, such as landmarks or masks, are often used to guide the synthesis process. For example, 2D landmarks are incorporated for alignment optimization of a skinned vertex-based human shape model to image observations. Landmark annotations may guide synthesis of observed 3D shape in input images. Landmarks or silhouettes may be incorporated to formulate additional objective terms to improve performance in 3D shape reconstruction and synthesis problems. However, these computer vision-based systems may not deal well with the noise and complexity from medical scanning and blending in projection-based medical imaging in particular.

SUMMARY

Systems, methods, and instructions on computer readable media are provided for reconstruction of a 3D shape from a topogram. A generative network is machine trained. The generative network includes a topogram encoder for inputting the topogram and a decoder to output the 3D shape from the output of the decoder. For training, one or more other encoders are included, such as for input of a mask and/or input of a 3D shape as a regularlizer. The topogram encoder and decoder are trained with the other encoder or encoders outputting to the decoder. For application, the topogram encoder and decoder as trained, with or without the encoder for the mask and without the encoder for the 3D shape, are used to estimate the 3D shape for a patient from input of the topogram for that patient.

In a first aspect, a method is provided for reconstruction of a 3D shape from a patient topogram in a medical imaging system. The patient topogram representing a projection through a patient in two dimensions is acquired. The 3D shape of an object represented in the patient topogram is reconstructed by a machine-learned generative network in response to input of the patient topogram to the machine-learned generative network. Information from the 3D shape is displayed.

The topogram is acquired with an x-ray imager or other projection imager. The 3D shape is reconstructed as an outer surface of the object, such as a surface mesh of the liver. The x-ray image includes the projection of the object, such as the organ, and the organ of the patient is reconstructed.

In one embodiment, the machine-learned generative network was trained as a generative adversarial network or was trained as a network with an encoder and decoder based on variational auto-encoding. In some embodiments, the network has a topogram encoder configured to receive the patient topogram and having been trained with a 3D shape encoder, which received as input training 3D representations in training data, and with the topogram encoder, which received as input training topograms in the training data. In other embodiments, the network has a topogram encoder configured to receive the patient topogram and having been trained with a mask encoder, which received as input masks in training data. In yet another embodiment, the machine-learned generative network was trained with a 3D shape encoder, which received as input 3D representations in training data, and with a mask encoder, which received as input masks in training data. For reconstruction, any of these embodiments reconstructs in response to input of the patient topogram with or without a mask of the object from the patient topogram.

In one approach, the displayed information is a 3D rendering of the 3D shape of the object. In another approach, the displayed information is a quantity, such as volume, determined from the 3D shape.

In a second aspect, a method is provided for machine-training to reconstruct a 3D representation of anatomy from a first topogram in a medical imaging system. A machine learning architecture having a first encoder configured to receive second topograms as input and a second encoder configured to receive masks or first 3D shapes as input is defined. The machine learning architecture is used to machine learn to output the 3D representation in response to input of the first topogram. A machine-learned model resulting from the machine learning is stored for later application.

In one embodiment, the architecture is defined as a decoder configured to receive outputs of the first and second encoders and to output second 3D shapes in response to receipt of the outputs of the first and second encoders. In one example, the architecture is defined where the second encoder is configured to receive the masks and a third encoder is configured to receive the first 3D shapes as input. In one approach, the architecture is defined as a generative model based on variational auto-encoding.

In a third aspect, a medical imaging system is provided for 3D organ estimation. An X-ray imager is configured to generate an X-ray image of a patient. An image processor is configured to generate an estimation of the 3D organ from input of the X-ray image to a machine-learned model. The machine-learned model is configured to receive as input views from a single direction where the X-ray image is of a view from the single direction. A display is configured to display information from the estimation of the 3D organ.

In one embodiment, the machine-learned model was trained using a first encoder for topograms and a second encoder for 3D shapes. In another embodiment, the machine-learned model was trained using a first encoder for topograms and a second encoder for organ contours in the topograms. In yet another embodiment, the machine-learned model was trained using a first encoder for topograms, a second encoder for 3D shapes, and a third encoder for organ contours in the topograms.

Any one or more of the aspects described above may be used alone or in combination. Any aspect or approach used for one type of claim (e.g., method or system) may be used in another type of claim (e.g., method, system, or computer readable medium). These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EMBODIMENTS 3D organ shape is reconstructed from a topogram Image. For example, liver shape in three dimensions is predicted using a generative model. 3D organ shape is automatically predicted directly from topogram images, which are easier to acquire and have limited exposure to radiation during acquisition as compared to volume CT scans. A 2D mask may be input to the generative model for improved prediction accuracy. Automatic or semi-automatic approaches to 3D organ shape reconstruction from topograms may be used to accurately predict the shape of the observed 3D organ given a single topogram or projection image. In an automatic delineation, the 3D shape is output from the topogram image only. In the semi-automatic delineation, the user outlines the approximate two-dimensional mask, which is used in conjunction with the topogram to obtain a more accurate 3D shape prediction.

In one embodiment, a generative shape model includes a 3D shape encoder and decoder and an encoder from 2D observations (topogram only or topogram and mask). The 3D shape encoder and decoder form a variational auto-encoder (VAE) generative model in order to represent each shape observation using a compact low-dimensional representation. The topogram and optional mask encoders map the partial observations from images (and masks when provided) to the coordinates of the corresponding shape observations. The entire architecture is optimized end-to-end in order to simultaneously infer shapes from topogram image observations and to learn the underlying shape space. This allows simultaneous learning of a generative shape space covering complex shape variations from the 3D supervisions and inference of the shapes from input 2D observations.

In the examples used herein, the organ of interest is the liver. The organ shape prediction approach is general and may be used for organs other than human liver, such as the lungs or kidney. The prediction approach may be used for other anatomy rather than a specific organ. The prediction approach may be used for inserted or non-natural objects, such as stents or joints.

Figure 1:
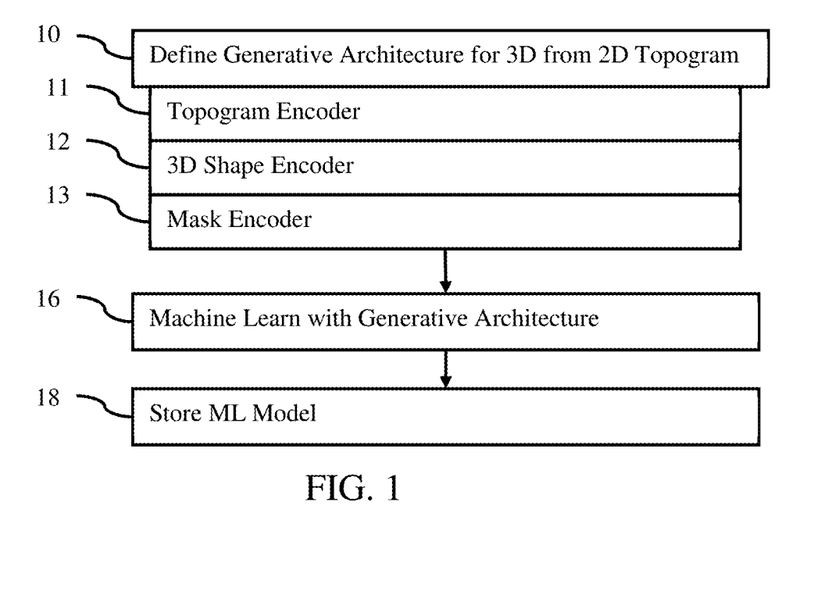
FIG. 1 is a flow chart diagram of one embodiment of a method for machine-training to reconstruct a 3D representation of anatomy from a topogram in a medical imaging system.

FIG. 1 is a flow chart diagram of one embodiment of a method for machine-training to reconstruct a 3D representation of anatomy from a topogram in a medical imaging system. A model is machine trained to predict the 3D shape of an organ from a single topogram or only images from one view direction (e.g., one or more topograms from the same or different times with projection along a same axis, such as a single topogram image and a mask created from the topogram). A generator model is machine trained to predict the 3D shape from the 2D projection. Alternatively, the machine is trained to predict 3D shape from topograms from different view directions without the iterative reconstruction of tomography. The model may be trained using encoders for receiving the topograms, 3D shapes, and/or masks and a decoder for outputting the 3D shape from the values of features provided by the encoders.

The method is performed in the order shown (i.e., top to bottom or numerical) or a different order. For example, acts 11, 12, and 13 are performed in any order. Additional, different, or fewer acts may be provided. For example, act 11 is provided without acts 12 and 13. In another example, only one of act 12 or 13 is provided with act 11 as part of act 10. As yet another example, acts for acquiring training data and/or application of the machine-learned generator model are included. The method is performed by a computer, server, workstation, or the system of FIG. 8 with access to a memory or database for storing training data or values of parameters of the architecture and/or generative model.

In act 10, a machine learning architecture is defined. A programmer programs or configures the architecture. For example, the type of machine learning is selected. An architecture or arrangement of nodes, layers, processing, operations, or another characteristic of the model to be learned is set. The number of layers or units, type of learning, and other characteristics of the network are controlled by the programmer or user. In other embodiments, one or more aspects (e.g., number of nodes, number of layers or units, or type of learning) are defined and selected by the machine during the learning. Using graphical programming, menu selections, or other approach, the architecture is defined.

In one embodiment, a generative (e.g., image-to-image) network is defined. Any machine training architecture for outputting a spatial distribution from an input spatial distribution may be used. The architecture is a neural network, such as a fully connected neural network or a convolutional neural network. The architecture includes one or more encoders and a decoder, such as in a U-net arrangement. A convolutional-to-transposed-convolutional network may be used. One segment (e.g., encoder) of layers or units applies convolution to increase abstractness or compression of an input topogram. The most abstract feature values (e.g., bottleneck) are then output to another segment. The other segment (e.g., decoder) of layers or units then applies transposed convolution to decrease abstractness or compression, resulting in outputting of a 3D shape.

In one embodiment, the architecture is defined to be a generative adversarial network (GAN). The GAN includes a generator, such as the image-to-image or U-Net, and a discriminator. The generator includes an encoder (convolutional) network and decoder (transposed-convolutional) network with a connection between passing features at a greatest level of compression or abstractness from the encoder to the decoder. Skip connections from the encoder to the decoder at lesser levels of compression may be included. The adversarial network is used in training to learn to distinguish the output of the generator from ground truth. The generator learns to output more realistic 3D shapes while the discriminator learns to better distinguish in iterative training. The generator, once trained, is used without the discriminator in testing or application. In other embodiments, the generator may be trained without the discriminator.

The generator is a deep architecture, which may include convolutional neural network (CNN) or deep belief nets (DBN). Other deep networks may be used. CNN learns feed-forward mapping functions while DBN learns a generative model of data. In addition, CNN uses shared weights for all local regions while DBN is a fully connected network (i.e., having different weights for all regions of an image). The training of CNN is entirely discriminative through back-propagation. DBN, on the other hand, employs the layer-wise unsupervised training (e.g., pre-training) followed by the discriminative refinement with back-propagation if necessary.

The network is defined as a plurality of sequential feature units or layers. Sequential is used to indicate the general flow of output feature values from one layer to input to a next layer. The information from the next layer is fed to a next layer, and so on until the final output. The layers may only feed forward or may be bi-directional, including some feedback to a previous layer. The nodes of each layer or unit may connect with all or only a sub-set of nodes of a previous or subsequent layer or unit.

Rather than pre-programming the features and trying to relate the features to attributes, the deep architecture is defined to learn the features at different levels of abstraction based on an input image with or without pre-processing. The features are learned to reconstruct lower level features (i.e., features at a more abstract or compressed level). For example, features for reconstructing a topogram are learned. For a next unit, features for reconstructing the features of the previous unit are learned, providing more abstraction. Each node of the unit represents a feature. Different units are provided for learning different features.

Within a unit or layer, any number of nodes is provided. For example, 100 nodes are provided. Later or subsequent units may have more, fewer, or the same number of nodes. In general, for convolution, subsequent units have more abstraction. For transposed convolution to reconstruct, the level of abstraction reverses. Each unit or layer reduces the level of abstraction or compression.

The features of the nodes are learned by the machine using any building blocks. For example, auto-encoder (AE) or restricted Boltzmann machine (RBM) approaches are used. AE transforms data linearly, and then applies a non-linear rectification, like a sigmoid function. The objective function of AE is the expected mean square error between the input image and reconstructed images using the learned features. AE may be trained using stochastic gradient descent or other approach to learn, by the machine, the features leading to the best reconstruction. Variational AE (VAE) may be used. The objective function of RBM is an energy function. Exact computation of the likelihood term associated with RBM is intractable. Therefore, an approximate algorithm, such as contrastive-divergence based on k-step Gibb sampling or other, is used to train the RBM to reconstruct the image from features. Sparsity or denoising techniques (e.g., sparse denoising AE (SDAE)) may be employed. Enforcing sparsity within hidden layers (i.e., only a small number of units in hidden layers are activated at one time) may also regularize the network. In other embodiments, at least one unit is a convolution with ReLU activation or is a batch normalization with a ReLU activation followed by a convolution layer (BN+LeakyRU+convolution). Max pooling, upsampling, downsampling, and/or softmax layers or units may be used. Different units may be of the same or different type.

Any now known or later developed architectures may be used. A support vector machine, Bayesian network, other neural networks, or other arrangements may be used. Other neural networks may be used.

Figure 2:
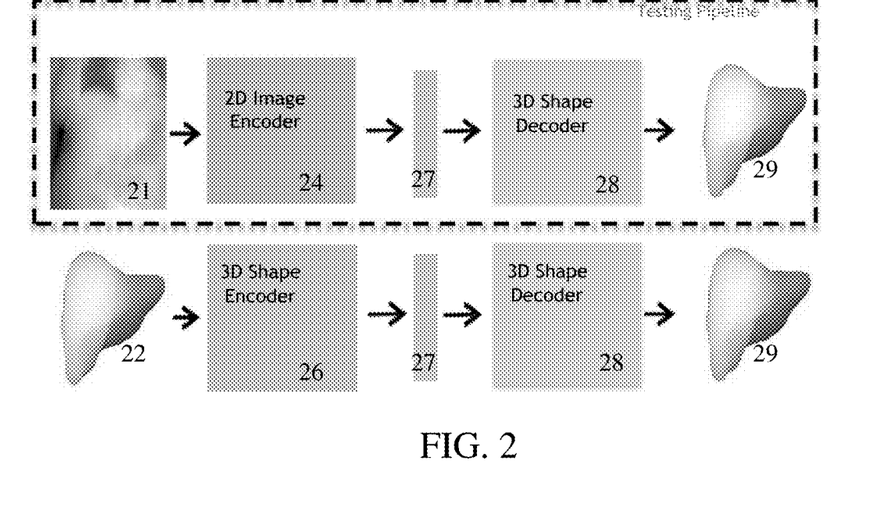
FIGS. 2 and 3 illustrate example architectures for machine training for 3D shape estimation from a 2D topogram.
Figure 3:
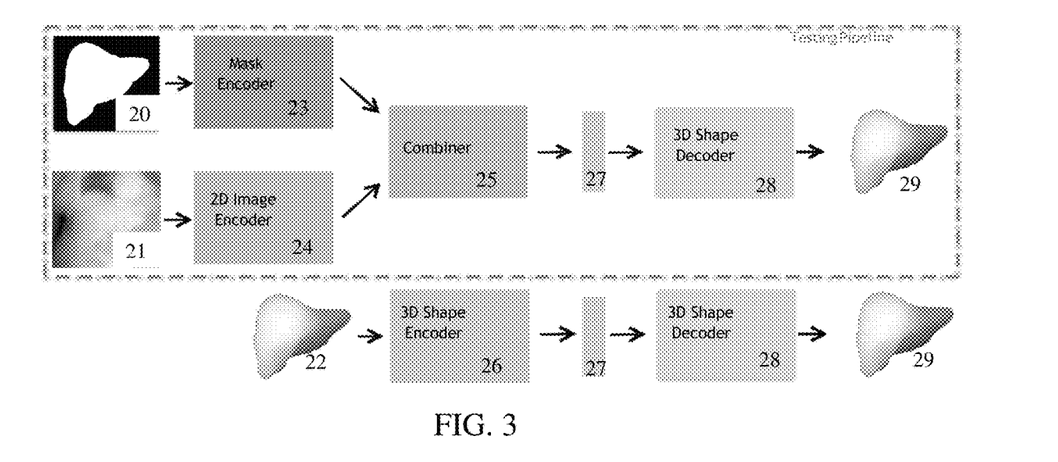

In one embodiment, a generative shape model is defined to include one or more encoders from 2D observations. FIGS. 2 and 3 show two embodiments of the defined architectures for learning and application. One encoder 24 receives as input topograms 21. FIGS. 2 and 3 show another 3D shape encoder 26 to receive 3D shapes 22 as input. FIG.

3 shows another mask encoder 23 to receive a mask 20 as 2D input. In other embodiments, the mask encoder 23 is provided without the 3D shape encoder 26. The mask encoder 23 is shown as being part of the learning (i.e., all of FIG. 3) and testing pipelines, but may be used in just the learning and not the testing pipeline in other embodiments. In both FIGS. 2 and 3, the 3D shape encoder 26 is used in just the learning pipeline and not the testing pipeline. The learning pipeline in FIGS. 2 and 3 is all of the architecture shown (e.g., testing pipeline and the encoder 26 shown outside of the testing pipeline).

The 3D shape encoder 26 receives as input a 3D shape 22, such as the ground truth 3D shape from a CT scan. This 3D shape encoder 26 is used as a regularlizer in training and not used in application (i.e., testing pipeline) as the 3D shape is not known for input. The generative model has the 3D shape encoder 26 and a decoder 28 shared by all the encoders 23, 24, 26 by receiving bottleneck feature values 27 from the different encoders 23, 24, 26. The 3D shape encoder 26 learns to map the 3D shapes of organs to their coordinates in the latent space, and the decoder 28 learns to reconstruct the shapes back from their coordinates. This generative model receives as input a set of examples E={(s,i)} where s∈S is the example shape 22 and i∈I is the corresponding topogram image 21 observation. The generative model G=(Q, P) includes encoding component Q. Q(z|s) maps shape s to its latent coordinate z in the stochastic low dimensional space distributed according to prior distribution p(z), and P (s|z) maps the latent coordinate z back to the shape space S.

The 3D shape encoder 26 maps an observation, represented with a 64 by 64 by 64 voxel grid to a 200-dimensional latent vector z. Other size voxel grids and/or vectors may be used. The normal distribution parameters are defined μ=0 and σ=1 for the variational auto-encoder model but other parameter values may be used. The architecture of the 3D shape encoder 26, according to one example embodiment, has five convolutional layers with output sizes 64, 128, 256, 512, 200, kernel size 4 for each layer, and padding sizes 1, 1, 1, 1 and 0. The convolutional layers are separated by batch-normalization and ReLU layers. Other sizes, numbers of layers, and/or types of layers may be used.

The decoder 28 architecture mirrors that of the 3D shape encoder 26. The decoder 28 may mirror other encoders 24, 23 or may have a different arrangement than the mirror of any of the encoders 23, 24, 26 in other embodiments. The decoder 28 is defined to receive outputs 27 of the encoders 23, 24, and/or 26 and output a predicted 3D shape 29 in response to receipt or input of the output values (e.g., outputs 27). The decoder 28 is defined as a transpose-convolutional network.

The topogram or 2D image encoder 24 receives topograms 21 as input. For training, the topograms I of the training data are received. For application, a patient topogram is received. The topogram encoder 24 learns to map two-dimensional projection observations to the coordinates of the corresponding shapes. Given a generative model G, the topogram image encoder 24 is learned so that for each observation (s, i)∈E, the image i is mapped to the coordinate location $\hat{z}=I_1(i)$ such that the reconstructed shape 29, $G(\hat{z})$, and the ground truth shape 22, s, are as close as possible.

In one embodiment, the topogram encoder 24 takes a 1 by 256 by 256 topogram image and outputs a 200-dimensional latent shape vector $\hat{z}$. The topogram encoder 24 is defined to have five convolutional layers with the number of outputs 64, 128, 256, 512, 200, kernel sizes 11, 5, 5, 5, 8 and strides 4, 2, 2, 2, 1, separated by batch-normalization and rectified linear units (ReLU). Other numbers of layers, input resolutions, outputs, sizes, strides, or types of layers may be used.

The mask encoder 23 receives as input masks 20. The masks 20 are formed from the topogram images 21, so have a same view direction or projection angle as the topograms 21. The mask 20 is a binary designation or labeling by pixel as representing or not representing the object for which the 3D shape 29 is to be predicted. In other embodiments, the mask 20 is a border or outline (i.e., a contour) of the object in the topogram 21. Other types of input (e.g., landmarks) that can be encoded using a neural network may also be applied in place of or with masks to improve prediction accuracy.

The mask encoder 23, if used, may or may not be used in application and is used in training. FIG. 2 shows an example not using the mask encoder 23. FIG. 3 shows the mask encoder 23 used for both testing and learning. The mask encoder 23 and the 2D image encoder 24 are a joint topogram and mask encoder, $I_2$, that predicts the latent coordinate of the organ shape given the 2D mask 20 and topogram 21. The mask information, when provided, helps generate a more accurate prediction. For each observation (s, i)∈E, given a topogram i and a mask k=P r(s)∈K, where Pr(•) is an orthographic projection operator, the joint topogram and mask encoder 23, 24 learns to outputs $\hat{z}=I_2(i, k)$ so that $G(\hat{z})$ and s are as close as possible. In alternative embodiments, the mask encoder 23 is used in the defined architecture of FIG. 2 instead of the 3D shape encoder 26. In other alternative embodiments, the mask encoder 23 is used for learning but not testing.

In one embodiment, the topogram and mask encoder, $I_2$, is defined to have a topogram encoder 24 branch, a mask encoder 23 branch and a common combiner network 25, so that the observations are mapped to a common latent coordinate $\hat{z}$. The combiner network 25 is a convolutional layer network but may have other arrangements. The topogram encoder 24 branch has the same architecture as the topogram encoder 24 discussed above and maps the topogram 21 to an intermediate 200-dimensional feature $v_1$. The mask encoder 23 branch receives a 1 by 64 by 64 binary mask image and learns to map to a 200-dimensional vector $v_2$ using five convolutional layers with kernel sizes of 3, 3, 3, 3, 3 and strides 4, 2, 2, 2, 2, separated by batch-normalizations and rectified linear units (ReLU). Other numbers of layers, sizes, strides, and/or types of layers may be used. The outputs of the encoders 23, 24, $v_1$ and $v_2$, are then concatenated and run through the combiner network 25, which is a single fully connected layer to predict a joint 200-dimensional latent coordinate $\hat{z}$. Other types of layers, sizes, and/or numbers of layers may be used for the combiner network 25.

Referring again to FIG. 1, a processor (e.g., image processor) machine learns with the machine learning architecture to output the 3D representation 29 in response to input of the topogram 21. For machine training, training data is acquired. The training data includes pairs of topograms 21 with ground truth shapes 22 of the objects (e.g., organ such as liver) represented in the topograms 22. The samples of the training data may also include masks, such as manually or automatically generated masks 20 for the topograms 21. The training data forms a database of shape and X-ray (two-dimensional observation) pairs.

For training, various optimizers may be used, such as Adadelta, SGD, RMSprop, or Adam. The weights of the network are randomly initialized, but another initialization may be used. End-to-end training is performed, but one or more features may be set. The various encoders 23, 24, 26 and decoder 28 with or without the combiner 25 are trained together or jointly rather than sequentially. A combined or single loss function comparing the predicted 3D shape 29 with the ground truth is used to update the various parts of the architecture. Batch normalization, dropout, and data augmentation are not used, but may be (e.g., using batch normalization and dropout). During the optimization, the different distinguishing features are learned. The features providing an indication of 3D shape from a topogram or topogram and mask are learned.

For training the architectures of FIG. 2 or 3, the training phase involves training the generative model (3D shape encoder 26 and decoder 28) jointly with the 2D observation encoders (topogram encoder 24 or the topogram encoder 24, mask encoder 23, and combiner 25) in an end-to-end procedure. During testing, only the 2D observations are necessary for 3D shape prediction.

The optimizer minimizes an error or loss, such as the Mean Squared Error (MSE), Huber loss L1 loss, or L2 loss. In one embodiment, the loss function of the generative model is composed of a reconstruction loss $L_{rec}$ and a distribution loss $L_{dist}$ for variational auto-encoder training. $L_{rec}$ is the binary cross entropy (BCE) error that measures the difference between the ground truth shape $s \in S$ and the predicted shape $s' \in S$. For example, $L_{rec}$ is represented by:

$$L_{rec}(s, s') = -\frac{1}{N}\sum_{n=1}^{N} s_n \log s'_n + (1 - s_n)\log(1 - s'_n)$$

where $N=64^3$. Other size or resolution may be used for N. $L_{dist}$ is the distribution loss that enforces the latent distribution of $z_1$ to match its prior distribution $L_{dist}(z_1)=KL(Q(z|s)\,p(z))$, where $p(z)=N(\mu, \sigma^2)$. The image encoder loss is the binary cross entropy (BCE) loss $L_{rec}(s, G(z\hat{}))$. The loss of the combined mask encoder 23 and topogram encoder 24, $I_2$, is the binary cross entropy (BCE) error $L_{rec}(s, G(z\tilde{}))$. An additional mask loss may be used, such as given by:

$$L_{mask}(k, k\tilde{}) = -\Sigma_{n-1}^{N} k_n \log k\tilde{}n + (1-k_n)\log(1-k\tilde{}n).$$

This mask loss ensures that the input mask k and the projected mask k˜ of the predicted shape (i.e., k˜=P r(G(z˜))) match. Other loss functions may be used for any of the encoders.

For combined training, all the components of the system are optimized together in an end-to-end training process using a combined objective, such as given by:

$$L = \alpha_1 L_{rec}(s, s') + \alpha_2 L_{KL} + \alpha_3 L_{rec}(s, G(z\overline{})) + \alpha_4 L_{mask}(k, k\tilde{}),$$

where $\alpha_{1-4}$ are weights applied to each type of loss, $z\overline{}=z\tilde{}$ if training the topogram-mask encoder 23, 24, and $z\overline{}=z\hat{}$ when training the topogram-only encoder 24. $\alpha_1 L_{rec}(s, s')$ is the reconstruction loss of the VAE and $\alpha_3 L_{rec}(s, G(z\overline{}))$ is the 2D-3D reconstruction loss. The model may be trained without the shape encoder, i.e. $\alpha_1=0$ and $\alpha_2=0$. Other combined loss functions may be used.

In act 18 of FIG. 1, the processor stores the trained model in memory. The various values of parameters of the architecture as defined are determined in training. These values and the architecture are stored in memory. This stored model may be used by the same or a different processor to predict a 3D shape from an input topogram or input topogram and mask. The stored machine-learned model may be duplicated in different systems for application to topograms by the different systems. For example, different workstations, computers, servers, medical scanners (e.g., x-ray imager), or other medical imaging systems apply the machine-learned model to topograms for different patients.

Figure 4:
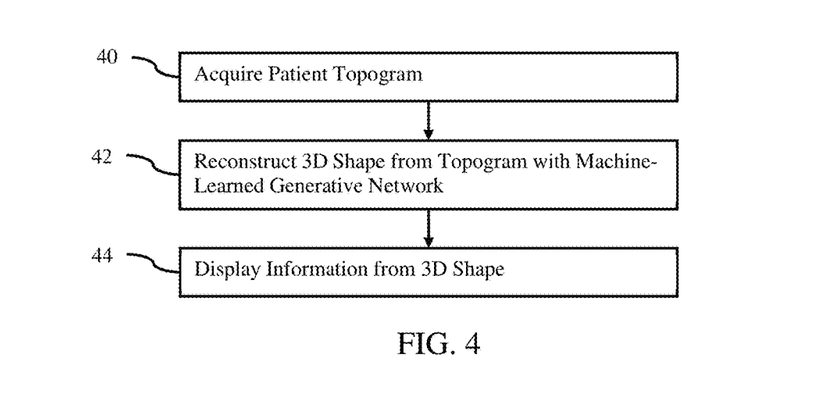
FIG. 4 is a flow chart diagram of one embodiment of a method for reconstruction of a 3D shape from a patient topogram in a medical imaging system.

FIG. 4 shows one embodiment of a method for reconstruction of a 3D shape from a patient topogram in a medical imaging system. The machine-learned model, such as the machine-learned generative network trained as discussed for FIG. 1, is applied for a given patient. A topogram, such as a single topogram, with or without a mask is input to the machine-learned model, which outputs a prediction of the 3D shape of an object represented in the topogram.

The method is performed in the order shown (e.g., top to bottom or numerical), but other orders may be used. Additional, different or fewer acts may be provided. For example, act 44 is not provided. In another example, an act for generating a mask manually or automatically from the topogram is included.

The method of FIG. 4 is implemented by a medical imaging system. The medical imaging system may be a computer, server, workstation, or medical imager or scanner. For example, an X-ray imager implements the acts. In another example, an X-ray imager or processor acquires the topogram in act 40; the same or different processor reconstructs in act 42; and a display device or screen displays in act 44. Other devices may be used.

In act 40, a single patient topogram is acquired. Multiple topograms from different times and/or different view directions (e.g., orientation of the x-ray source relative to the patient) may be acquired. The topogram is an X-ray image or other image representing a projection (e.g., integration) along one dimension to a 2D image (e.g., N×M where N and M are integers greater than one).

The acquisition is by scanning the patient. For example, an X-ray imager generates X-rays directed at the patient. A detector on an opposite side of an X-ray source detects the X-rays, providing an indication of X-ray intensity per pixel of the detector. In other embodiments, the acquisition is from transfer over a computer network or loading from memory. For example, the X-ray image is acquired from a picture archival and communications system (PACS).

The topogram for the patient includes a projection of an object of interest, such as the liver. The entire object in 2D is represented in the topogram (i.e., projection of the object to 2D). Alternatively, only part of the object is represented. The topogram may represent other objects or devices, such as other organs, bone, or inserted devices. Alternatively, the topogram is processed to remove information from other objects.

A mask may be generated from the topogram. For example, segmentation is applied. A machine-learned model segments the object, identifying locations representing the object in the topogram. Other segmentation, such as based on thresholding, gradients, or another algorithm may be used. In other embodiments, the user manually enters the segmentation, such as tracing a boundary of the object in the topogram.

In act 42, an image processor reconstructs the 3D shape of an object represented in the patient topogram, such as reconstructing a liver or other organ of the patient in 3D (i.e., representation of spatial extent over three dimensions). The 3D shape is reconstructed as an outer surface of the object. The outer surface that led to the topogram representation of the object is estimated. The outer surface may be a continuous surface, voxel representation, or a mesh. Alternatively, the 3D shape is reconstructed as a solid (e.g., outer surface and interior).

The topogram with or without a mask is input to a machine-learned generative network, which outputs the 3D shape. For example, the topogram and mask at a same resolution are input as two channels to the generative network. Any inputs for which the generative network is trained to use are applied as an input feature vector, such as (a) just the single topogram or (b) just the single topogram and a single mask.

The encoder or encoders calculate values for bottleneck and other features in response to the input to the encoder or encoders. A decoder generates the 3D shape from the bottleneck features or bottleneck and other features. Skip connections may be used, so the 3D shape may be generated from values for features in skip connections and values for bottleneck features. The encoder (e.g., topogram encoder) or encoders (e.g., topogram and mask encoders) were trained in conjunction with (e.g., jointly with) 3D shape and/or mask encoders not used in the application.

In response to the input, the generative network outputs a synthetic estimation of the 3D shape of the object. Any parameterization of the shape may be used, such as a voxel, mesh, or continuous surface representation. In an alternative embodiment, the 3D shape is output as an animation of 3D renderings of the object (e.g., sequence of 2D views rendered from different viewing directions).

In act 44, the image processor generates an image, and a display displays the image. The image includes information from the 3D shape. The image is generated as a visual representation of the 3D shape. Volume rendering or another 3D rendering is used to generate the image. Alternatively or additionally, the image includes alphanumeric text, graph, or another indicator of a quantity characterizing the 3D shape, such as the volume of the 3D shape or a measure of surface smoothness or variance.

The topogram and/or mask may be included in the image or displayed at a same time as the information. Other patient information may also be displayed.

The image may be output to a display, into a patient medical record, and/or to a report. The information from the 3D shape may be used for diagnosis, prognosis, treatment planning, or other purpose.

In one embodiment of training and application, $\alpha_1=50.0$, $\alpha_2=0.1$, $\alpha_3=50.0$ and $\alpha_4=0.0001$ if the mask is provided as input or $\alpha_4=0$ otherwise (i.e., for a topogram only approach). All models are trained using the Adam optimizer with learning rate 0.0001 for 250 epochs and batch size of 32. The training data is for the task of estimating a 3D shape of the human liver and predicting the volume. Due to their heterogeneous and diffusive shape, automatic liver segmentation is a very complex problem. In a less complex approach, the 3D shape of the liver is estimated from a 2D topogram image and optionally a 2D mask. Voxel grids are used as the base representation, and results are visualized using 2D projections or 3D meshes obtained using marching cubes. The effect of shape context provided by the mask observations is investigated by evaluating a baseline where 3D shape is predicted directly from the mask.

Figure 5:
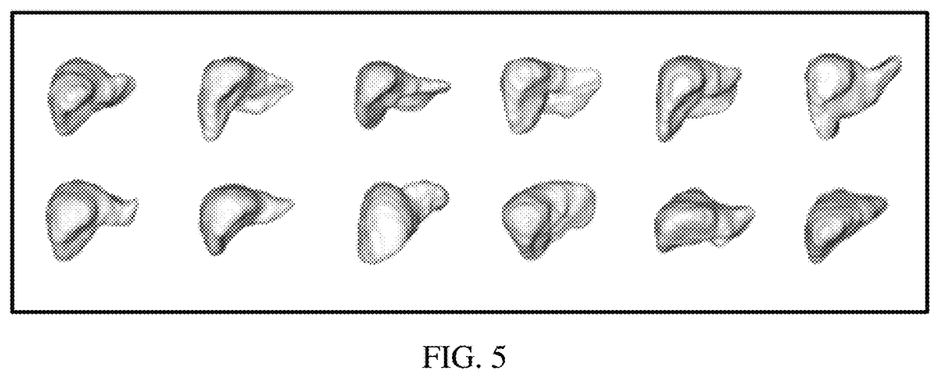
FIG. 5 shows 3D shape variations in livers from CT scans.

To conduct an experimental evaluation, 2129 abdominal CT scans (e.g., 3D volumetric images of the abdomen covering the liver) are collected from several different hospital sites. The liver shapes are segmented from the CT scans using a volumetric segmentation approach, and topograms and masks are extracted via 2D projection. Example renderings of 3D shapes from the dataset are shown in FIG. 5. 1554 scans are used for training, and 575 scans are used for testing.

Given a learned generative model of liver shapes including an image encoder that estimates a latent space vector given a topogram image (and mask, if given), the 3D liver shape is output. This 3D shape is projected back onto the topogram image plane to perform two-dimensional delineation to test accuracy. Visually delineating accurate shape from topograms is particularly difficult due to visual ambiguities, such as color contrast and fuzzy boundaries. Using the trained architecture of FIG. 2 or 3, the 3D shapes may be automatically predicted from the topogram. The prediction, given a two-dimensional mask annotation, may be refined or made more accurate.

Figure 6:
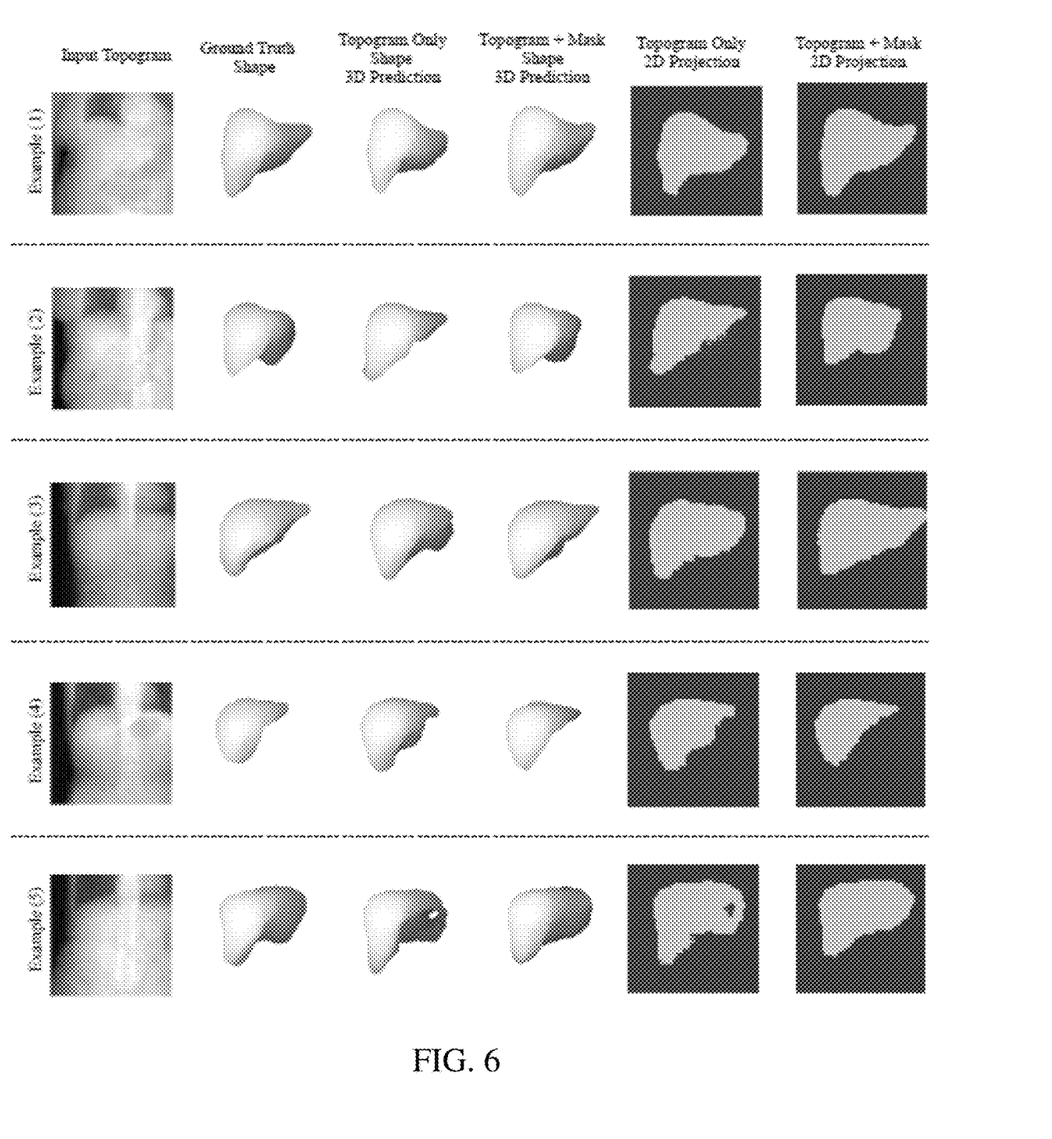
FIG. 6 shows example 3D organ shape reconstructions from example topograms using different architectures in training.

FIG. 6 shows qualitative evaluation. In FIG. 6, the 3D reconstruction results are visualized. The first column is a visualization of the input topogram, the second column is the visualization of the ground truth 3D shape (surface or volume rendering of the 3D shape), the third column is the visualization of the result of the topogram-only approach (i.e., trained using the architecture of FIG. 2), the fourth column is the visualization of the result of the topogram+ mask approach (i.e., trained using the architecture of FIG. 3), and the fifth and sixth columns are visualizations of projected masks of the corresponding two approaches, overlaid with the ground truth masks. Each row corresponds to a different example.

Both proposed approaches (i.e., trained with FIGS. 2 and 3) are able to capture significant variation in the observed shapes, such as a prominent dome on the right lobe in Example 1 of FIG. 6 and shape of the left lobe in Example 5 of FIG. 6. The topogram+mask method is able to convey more topological details compared to the topogram-only method, such as an elongated interior tip in Examples 1 and 4, protrusion off left lobe in Examples 2 and 3, and overall topology in Example 5, where the mask-based method corrects the hole artifact introduced by the topogram-only method. Overall, the 3D surfaces in predictions from the mask-based method are visually closer to the ground truth.

Figure 7:
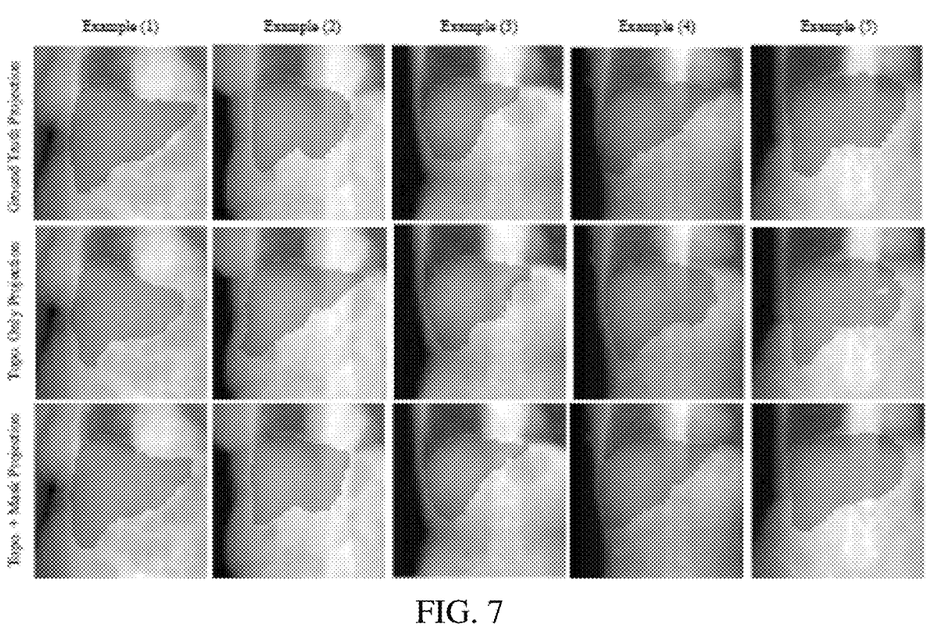
FIG. 7 shows example 2D projections from predicated 3D organ shapes.

FIG. 7 shows projection of the 3D shape predictions directly on the input topograms. The ground truth projections are shown in first row, the topogram only prediction projections are shown in the second row, and the topogram+ mask projections are shown in third row. By predicting the 3D shape of the organ, an accurate 2D segmentation of the input topograms via projection may be generated and displayed or used to calculate a quantity. The displayed images allow visualization of the corresponding inferred 2D segmentation. The shape reconstruction network (in both topogram only and topogram+mask methods) learns to emphasize characteristic parts of the organ shape, such as the curves in the right lobe and interior tip.

In a quantitative evaluation, several metrics may be used to quantitatively compare 3D shape reconstructions. The machine-learned generative model of FIG. 2 (topogram only in application), the machine-learned generative model of FIG. 3 (topogram+mask in application), and a mask only (i.e., FIG. 2 where a mask encoder 23 is used instead of the topogram encoder 24, learning to reconstruct 3D shape directly from mask with no topogram image being provided) are tested. Volume-based metrics of intersection over union (IoU) and Dice coefficients are used. A surface-based metric of Hausdorff distance is used. Table 1 shows the results:

| Metric (Mean) | Mask Only | Topogram Only | Topogram + Mask |
|---|---|---|---|
| IOU | 0.58 | 0.78 | 0.82 |
| Dice | 0.73 | 0.87 | 0.90 |
| Hausdorff | 28.28 | 7.10 | 5.00 |

The topogram+mask approach outperforms the topogram only approach according to all of the metrics, but especially according to Hausdorff distance, which is very sensitive to shape variations such as critical cases of incorrect tip or bulge presence prediction.

The mask-only approach may be used to show whether the provided mask provides too much context, rendering the problem of 3D shape prediction a much easier task. In Table 1, the performance of this baseline and the two methods that receive the topogram as input are compared. The mask only method is unable to achieve the same quality of results as the topogram-based methods, generating significantly lower mean IoU and Dice errors, and a much larger Hausdorff error. The topogram images contain important information, such as shape layout, that is complementary to the context extracted from masks, and thus both inputs are may be used for high quality reconstruction.

Automatic volume measurement of main organs is often important for medical analysis (e.g., diagnosis, prognosis, or planning). The predicted 3D shape may be used to directly measure organ volume. Organ volume is given from a topogram. Table 2 shows a comparison of volume errors.

| Metric | Mask Only | Topogram Only | Topogram + Mask |
|---|---|---|---|
| Volume Error ($V_f$) | 0.34 | 0.10 | 0.06 |

The volume error is a difference of the proposed approaches to a volume of a voxelized 3D segmentation of the liver, obtained from segmentation of the 3D CT, as the ground truth. Given the 3D shape prediction, the predicted volume is measured as the number of voxels in the generated shape. The number of voxels is converted to milliliters (mL) using scanning configuration parameters, which indicate a volume of each voxel. The volume error prediction used is $V_f=\|V_{pred}-V_{gt}\|/V_{gt}$ where $V_{pred}$ and $V_{gt}$ are the volumes of the predicted and ground truth organs, respectively.

On average, the liver volume is predicted to 6% error with the topogram+mask method and to 10% error with the topogram only method. The mask-only based method is unable to predict volume accurately, since it cannot predict the correct 3D topology.

The above qualitative and quantitative comparisons are based on using a machine-learned generative network. The same architectures using the same training data may be trained as a GAN (e.g., 3D VAE-GAN) by including a discriminator in adversarial training. The discriminator in this baseline typically encourages more uniform predictions compared to a VAE-based method without the discriminator, thus discouraging generation of more diverse shape topologies. Quantitatively, GAN achieves lower quality results than the both VAE-based methods without the discriminator in training. Table 3 shows the difference in results for the volume quantity and 3D shape errors.

The 3D-GAN approach suffers in surface-based error and volume error due to its tendency to predict an average shape irrespective of the input.

3D organ shape reconstruction from topograms is an extremely challenging problem in medical imaging. Among other challenges, it is a difficult problem because the input X-ray images may contain projection artifacts that reconstruction methods need to handle, in addition to predicting the topology of occluded and unseen parts the 3D organ. Despite the visual ambiguities present in this type of imagery, it is possible to predict 3D organ shape directly from topograms. It is also possible to improve the quality of the prediction by providing supplementary two-dimensional shape information in the form of masks. By defining the shape space in training using the 3D shape ground truth as an input, accurate 3D shape estimation is provided.

Figure 8:
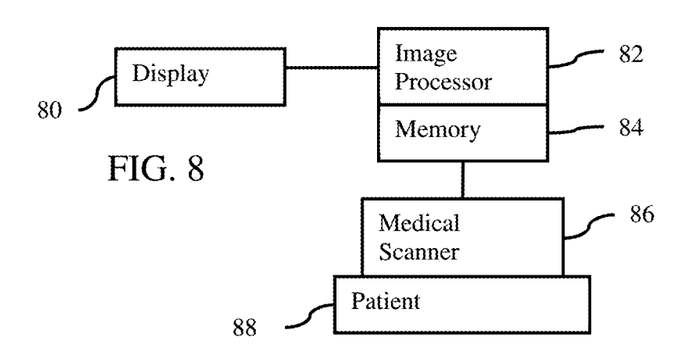
FIG. 8 is a block diagram of one embodiment of a system for 3D organ estimation from a topogram.

FIG. 8 shows a medical imaging system for 3D organ estimation. The medical imaging system includes the display 80, memory 84, and image processor 82. The display 80, image processor 82, and memory 84 may be part of the medical imager 86, a computer, server, workstation, or other medical system for image processing medical images from a scan of a patient. A workstation or computer without the medical imager 86 may be used as the medical imaging system.

Additional, different, or fewer components may be provided. For example, a computer network is included for remote 3D shape generation of a locally captured topogram. As another example, a user input device (e.g., keyboard, buttons, sliders, dials, trackball, mouse, or other device) is provided for user mask input or creation from a displayed topogram.

The medical imager 86 is a medical diagnostic scanning system configured to generate a projection (i.e., topogram) image of the patient. In one embodiment, the medical imager 86 is an X-ray imager to generate an X-ray image of the patient. An X-ray source and detector are positioned on opposite sides of at least part of the patient 88. The X-ray source generates X-rays, which pass through the patient 88 and impinge upon the detector. The X-ray imager reads from the detector the intensities of the X-rays at different locations. The reading at each location represents contribution from tissues in the patient along a ray from the X-ray source to the location, providing a projection collapsing the third dimension. Other projection imagers may be used.

The medical imager 86 is configured to generate the X-ray image as representing a volume object in the patient in the two dimensions of the projection. The configuration uses settings for one or more parameters, such as an X-ray source

| | Volume Prediction | Shape Reconstruction | | |
|---|---|---|---|---|
| | Volume Error ($V_f$) | IoU | Dice | Hausdorff |
| Variational Autoencoder (VAE) (without/with mask) | 0.10/0.06 | 0.78/0.82 | 0.87/0.90 | 7.10/5.00 |
| Adversarial (3D-GAN) | 0.21 | 0.61 | 0.75 | 10.50 |
| Performance Difference | 109%/250% | 22%/26% | 14%/17% | 48%/110% | voltage, table position and/or range of movement, gantry position and/or range of movement, focus, field of view, collimation, detector thresholds, image processing settings, filtering settings, and/or image generation settings.

The image processor 82 is a control processor, general processor, digital signal processor, 3D data processor, graphics processing unit, application specific integrated circuit, field programmable gate array, digital circuit, analog circuit, artificial intelligence processor, combinations thereof, or other now known or later developed device for processing medical image data, such as a topogram. The image processor 82 is a single device, a plurality of devices, or a network of devices. For more than one device, parallel or sequential division of processing may be used. Different devices making up the image processor 82 may perform different functions, such as applying a machine-learned model to an X-ray image by one device and rendering a view of the 3D shape output from the application by another device. In one embodiment, the image processor 82 is a control processor or other processor of a medical diagnostic imaging system, such as the medical imager 86. The image processor 82 operates pursuant to stored instructions, hardware, and/or firmware to perform various acts described herein.

The image processor 82 is configured to train a machine learning architecture. Based on a user provided or other source of the network architecture and training data, the image processor 82 learns features for encoders, decoders, discriminators, or other network parts to train the model. The result of the machine training is a machine-learned model or models for 3D shape prediction with or without mask parameterization.

Alternatively or additionally, the image processor 82 is configured to apply one or more machine-learned models. The machine-learned model is applied as a standalone application on the workstation or a local device or as a service deployed on a computer network (cloud) architecture.

The machine-learned model generates an estimation of a 3D shape of an organ or anatomy of the patient in response to input of the X-ray image or X-ray image and mask. For example, a machine-learned generative network is applied to a X-ray image or X-ray image and mask for the patient 88. The machine-learned model includes input channels and corresponding modules (e.g., encoders) for the X-ray image and the mask, if provided. When being trained, the model includes an input channel and module (e.g., encoder) for a 3D shape and/or mask for regularization. The resulting X-ray image encoder with or without the mask encoder are then used in application without one or more encoders that were used in the training.

A single X-ray image may be used to predict the 3D shape. The X-ray image alone or the X-ray image and a mask image derived from the X-ray image are input to generate the estimation of the 3D shape of the organ or other object. The inputs are all views of the patient 88 from a same direction, such as using the same projection lines in parallel or as diverging from a common source. The views from the single direction are input to estimate the 3D shape. In alternative embodiments, views from different directions are input to estimate the 3D shape without tomography.

Based on the previous training, the machine-learned model generates a 3D shape in response to application of the X-ray image with or without a mask image. The image processor 82 may be configured to calculate a quantity or quantities from the 3D shape, such as a volume.

The image processor 82 is configured to generate an image. The 3D shape output from the machine-learned model may be volume or surface rendered to create an image. Alternatively, annotations or graphics, such as for a quantity determined from the 3D shape, may be the generated image (e.g., displaying a report with the quantity) or may be added to the X-ray image. In another alternative, the image processor 82 projects from the predicted 3D shape to create a segmentation or mask. The projection is displayed or used to segment the X-ray image where the segmentation is displayed as the image.

The display 80 is a CRT, LCD, projector, plasma, printer, tablet, smart phone or other now known or later developed display device for displaying the generated image. The display 80 displays a medical image generated from information from the predicted 3D shape, such as information for an estimated 3D organ.

The X-ray image, mask, network definition, features, machine-learned model, training data, output 3D shape, information derived from the 3D shape, image, and/or other information are stored in a computer readable memory, such as the memory 84. The memory 84 is an external storage device, RAM, ROM, database, and/or a local memory (e.g., solid state drive or hard drive). The same or different non-transitory computer readable media may be used for the instructions and other data. The memory 84 may be implemented using a database management system (DBMS) and residing on a memory, such as a hard disk, RAM, or removable media. Alternatively, the memory 84 is internal to the processor 82 (e.g. cache).

The instructions for implementing the training or application processes, the methods, and/or the techniques discussed herein are provided on non-transitory computer-readable storage media or memories, such as a cache, buffer, RAM, removable media, hard drive or other computer readable storage media (e.g., the memory 84). Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network. In yet other embodiments, the instructions are stored within a given computer, CPU, GPU or system. Because some of the constituent system components and method steps depicted in the accompanying figures may be implemented in software, the actual connections between the system components (or the process steps) may differ depending upon the manner in which the present embodiments are programmed.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for reconstruction of a three-dimensional shape from a patient topogram in a medical imaging system, the method comprising:
    acquiring the patient topogram representing a projection through a patient in two dimensions;
    reconstructing the three-dimensional shape of an object represented in the patient topogram, the reconstructing being by a machine-learned generative network in response to input of the patient topogram to the machine-learned generative network, wherein the machine-learned generative network comprises:
        a mask encoder configured to predict a first latent coordinate of an organ shape given a 2D mask;
        a 2D image encoder configured to predict a second latent coordinate given a 2D topogram image;
        a combiner configured to map the outputs of the mask encoder and the 2D image encoder to a common latent coordinate;
        a 3D shape encoder configured to input a 3D shape, wherein the 3D shape encoder is used as a regularlizer in training of the machine-learned generative network and is not used in application of the machine-learned generative network; and
        a shape decoder configured to input the common latent coordinate and output the three-dimensional shape; and
    displaying information from the three-dimensional shape.

2. The method of claim 1, wherein acquiring comprises acquiring with an x-ray imager.

3. The method of claim 1, wherein reconstructing comprises reconstructing the three-dimensional shape as an outer surface of the object.

4. The method of claim 1, wherein acquiring comprises acquiring an x-ray image as the patient topogram, the x-ray image including the projection of the object, the object comprising an organ, and wherein reconstructing comprises reconstructing the organ of the patient.

5. The method of claim 1, wherein reconstructing comprises reconstructing by the machine-learned generative network having been trained as a generative adversarial network.

6. The method of claim 1, wherein reconstructing comprises reconstructing by the machine-learned generative network comprising an encoder and decoder based on variational auto-encoding.

7. The method of claim 1, wherein displaying comprises displaying a three-dimensional rendering of the three-dimensional shape of the object.

8. The method of claim 1, wherein displaying comprises displaying a quantity determined from the three-dimensional shape.

9. A method for machine-training to reconstruct a three-dimensional representation of anatomy from a first topogram in a medical imaging system, the method comprising:
    defining a machine learning architecture comprising a mask encoder configured to predict a first latent coordinate of an organ shape given a 2D mask;
        a 2D image encoder configured to predict a second latent coordinate given a 2D topogram image;
        a combiner configured to map the outputs of the mask encoder and the 2D image encoder to a common latent coordinate;
        a 3D shape encoder configured to input a 3D shape; and
        a shape decoder configured to input the common latent coordinate and output the three-dimensional shape;
    machine learning with the machine learning architecture to output the three-dimensional representation in response to input of the first topogram, wherein the 3D shape encoder is used as a regularlizer in training of the machine-learned generative network and is not used in application of the machine-learned generative network; and
    storing a machine-learned model resulting from the machine learning.

10. The method of claim 9, wherein defining comprises defining the machine learning architecture as a generative model based on variational auto-encoding.

11. A medical imaging system for three-dimensional organ estimation, the medical imaging system comprising:
    an X-ray imager to generate an X-ray image of a patient;
    an image processor configured to generate an estimation of the three-dimensional organ from input of the X-ray image to a machine-learned model, the machine-learned model configured to receive as input views from a single direction, wherein the machine-learned model comprises a mask encoder configured to predict a first latent coordinate of an organ shape given a 2D mask;
        a 2D image encoder configured to predict a second latent coordinate given a 2D topogram image;
        a combiner configured to map the outputs of the mask encoder and the 2D image encoder to a common latent coordinate;
        a 3D shape encoder configured to input a 3D shape, wherein the 3D shape encoder is used as a regularlizer in training of the machine-learned generative network and is not used in application of the machine-learned generative network; and
        a shape decoder configured to input the common latent coordinate and output the three-dimensional shape, the X-ray image being a view from the single direction; and
    a display configured to display information from the estimation of the three-dimensional organ.

* * * * *